(12) United States Patent
Laberge

(10) Patent No.: US 6,252,622 B1
(45) Date of Patent: Jun. 26, 2001

(54) FAULT TOLERANT LASER DIODE ARRAY

(75) Inventor: Michel G. Laberge, Bowen Island (CA)

(73) Assignee: Creo Products Inc., Burnaby (CA)

( * ) Notice: Subject to any disclaimer, the term of this patent is extended or adjusted under 35 U.S.C. 154(b) by 0 days.

(21) Appl. No.: 09/228,077

(22) Filed: Jan. 6, 1999

(51) Int. Cl.$^7$ ................................ B41J 2/45; B41J 2/455
(52) U.S. Cl. ......................... 347/238; 347/236; 347/237; 347/234; 347/233; 347/246; 347/247; 347/248
(58) Field of Search ..................................... 369/112, 121, 369/122; 359/196; 372/36, 43, 50; 347/233, 238, 241, 234, 237, 247, 248, 236, 246

(56) References Cited

U.S. PATENT DOCUMENTS

| | | | |
|---|---|---|---|
| 4,524,372 | * | 6/1985 | De Cock et al. ................... 347/238 |
| 4,743,091 | * | 5/1988 | Gelbart ................................ 350/252 |
| 5,053,789 | * | 10/1991 | Fujii et al. ........................... 347/225 |
| 5,631,918 | * | 5/1997 | Kovacs et al. ...................... 372/36 |
| 5,638,393 | * | 6/1997 | Kovacs ................................ 372/50 |
| 5,802,092 | * | 9/1998 | Endriz ................................. 372/50 |
| 5,808,656 | * | 9/1998 | Goldmann .......................... 347/238 |
| 5,936,657 | * | 8/1999 | Fork ................................... 347/237 |
| 5,987,043 | * | 11/1999 | Brown et al. ........................ 372/36 |

FOREIGN PATENT DOCUMENTS 5-338261 * 12/1993 (JP) ................................ B41J/2/44

OTHER PUBLICATIONS

"High Power Multi–Channel Writing Heads" by Dan Gelbart, IS&T 10$^{th}$ International Congress on Advances in Non Impact Technologies 1994, pp. 337–339.*
Gelbart, Dan, "High Power Multi–Channel Writing Heads", IS&T's Tenth International Congress on Advances in Non–Impact Printing Technologies, 1994, pp. 337–339.*

* cited by examiner

Primary Examiner—Andrew Q. Tran
(74) Attorney, Agent, or Firm—Oyen Wiggs Green & Mutala

(57) ABSTRACT

A method and apparatus for a fault tolerant recording system using a pair of laser diode arrays is disclosed. Two monolithic laser diode arrays made of individually addressable diodes are used to record parallel tracks on a recording surface. A pair diodes, (one diode from each array) are assigned to each track, but only one diode (the primary diode) is activated. In the case where the primary diode fails, the secondary diode is activated. Digital delays are employed to synchronize the data from the two diode arrays in order to align the written marks on the recording surface.

23 Claims, 3 Drawing Sheets

FAULT TOLERANT LASER DIODE ARRAY

FIELD OF THE INVENTION

The invention herein disclosed relates to laser diode recording systems and more specifically to printing systems employing laser diode arrays for recording.

BACKGROUND OF THE INVENTION

Laser diodes have been used in many prior art recording techniques as have monolithic laser diode arrays. Monolithic laser diode arrays used in recording typically contain 10–100 diodes and the recording is done with either photonic exposure or thermal exposure. Photonic systems react to the total exposure to photon energy, such that each photon striking the recording surface helps to expose it. Conversely thermal systems respond to peak temperatures and must reach a certain threshold for exposure to occur. Thermal systems usually operate in the infrared (IR), while photonic systems usually operate in the visible or ultraviolet (UV) range, but either system can operate in any range of the spectrum. Each diode may be a single mode source or a short multiple mode stripe and is said to record a particular "track" on the recording surface. Diode arrays can contain anywhere from 10 to 1000 diodes. In typical printing applications, the tracks on the recording surface are spaced between 10 and 20 microns apart, but for data storage applications, the tracks can be as close together as 0.5 microns, in order to permit high density recording.

A current problem associated with the use of monolithic laser diode arrays is the diode spacing within the array. Current technology in semiconductor fabrication can only produce arrays in which the diodes are spaced in the neighborhood of 10–100 microns and, as mentioned above, recording requires data spacing down to 0.5 microns. The laser diodes can not be de-magnified optically because of the large numerical aperture of the laser emission. Consequently, to achieve the required density of tracks on the recording surface, a non-optical method is required to reduce the effective diode spacing. Such methods normally include one of two techniques: angled diode arrays and interleaving.

An angled diode array is depicted in FIG. 1. The diode array 1 is maintained at an angle θ with respect to the perpendicular of the scan direction 11. Diode spacing a is typically between 10 and 100 μm on the array, but because the array is angled, the spots 7 which are printed in the tracks on the recording surface 6 are more closely spaced with separations of b=a.cos θ. Printing the data onto the recording surface 6 in a linear fashion requires that the diodes of the angled array 1 be activated in a delayed fashion. The desired location of the printing dots 7 is in a horizontal line on the printing surface 6. Because the printing surface 6 is scanning (i.e. moving relative to the laser diode array 1) in direction 11, the various lasers must be delayed so that they are not activated until the desired location 7 on the printing surface 6 is reached. Diode 1a is not delayed, and data is fed straight into it. However, data flowing to diode 1b must be delayed slightly until spot 7b is directly under diode 1b. The required delay t is easily determined from the diode spacing a, the array angle θ and the scan velocity. The delay required for the other diodes 1c, and 1d is simply a multiple of that required for 1b. Using this technique of coupling the angled diode array with digital delays, the effective track spacing can be reduced on the recording surface overcoming the diode spacing limitation of semiconductor fabrication technology.

A second method of overcoming the diode spacing limitation requires interleaving. Interleaving involves multiple passes with a diode array, such that each pass fills in only a limited number of tracks and then subsequent passes fill in the remaining tracks in order to complete the recording. Both slanting and interleaving are well known and discussed in "High Power Multi-Channel Writing Heads", by Dan Gelbart, published in the "IS&T Tenth International Congress on Advances in Non-Impact Printing", Nov. 1994, which is hereby incorporated by reference.

A second major problem associated with monolithic diode arrays and their use in recording is the failure rate of the diodes. Moreover, if any of the diodes in the array fails, then the entire array is ruined and can no longer be used as a recording means. A need exists for a technique to overcome isolated failures of single diodes within the array, so that the array may still function.

Accordingly, it is an object of this invention to provide a fault tolerant diode array recording system which is capable of overcoming isolated diode failures within a diode array, so as to effectively record data onto a recording surface.

SUMMARY OF THE INVENTION

A fault tolerant laser diode array apparatus is disclosed. The apparatus is operative to record multiple parallel tracks on a recording surface and is comprised of a plurality of laser diodes made up of several smaller groups of diodes. Each group of diodes is assigned to a different one of the parallel tracks. Within each group, there is a designated diode called the primary diode which is operative to receive input data, emit optical energy in correspondence with the data, and record the data on the assigned track.

The apparatus also comprises a selection subsystem which, in the case of a failure of any of the primary diodes, is operative to selectively activate a functional secondary diode within the group of diodes that contains the failure.

Because the groups contain at least two diodes and the selection subsystem is able to selectively activate one diode from within each group, there is always a functional diode assigned to each one of the parallel tracks.

Preferably, the selection subsystem may be further operative to detect a failure in any one of the primary diodes.

The plurality of laser diodes may be comprised of at least two distinct laser diode arrays and the groups of diodes may comprise one diode from each array.

The apparatus may also comprise a delay network operative to compensate the primary diodes so as to ensure that the primary diodes are operative to record in the correct location on the recording surface independent of the primary diodes being located on any of the distinct laser diode arrays.

Advantageously, the plurality of laser diodes may be single mode laser diodes or multi-mode laser diodes and the method of recording on the recording surface may be thermal or photonic in nature.

The apparatus may contain many groups of diodes. The number of diodes in each group may range between 10 and 1000.

A second aspect of the invention involves a fault tolerant monolithic laser diode array apparatus operative to record multiple parallel tracks on a recording surface. The apparatus comprises two monolithic laser diode arrays which are arranged face to face in a manner such that a pair of diodes (one from each of the arrays) is assigned to each one of the parallel tracks. The pair of diodes consists of one active diode and one secondary diode. The primary diode is operative to receive input data, emit optical energy in correspondence with the data, and record the data in the assigned track.

The apparatus also comprises a selection subsystem which, in the case of a failure of the primary diode, is operative to activate the secondary diode within the pair of diodes that contains the failure, making the secondary diode into the primary diode.

Preferably, the selection subsystem may be further operative to detect a failure the primary diode.

The apparatus may also comprise a delay network operative to compensate the primary diode, so as to ensure that the primary diode is operative to record in the correct location on the recording surface independent of the primary diode being located on either of the monolithic laser diode arrays.

Advantageously, the laser diode arrays may comprise diode which are single mode laser diodes or multi-mode laser diodes and the method of recording on the recording surface may be thermal or photonic in nature.

The apparatus may be operative to record on a number of parallel tracks ranging between 10 and 1000.

A third aspect of the invention is a fault tolerant method of employing laser diode arrays to record multiple parallel tracks on a recording surface. The method comprises the steps of:

(a) aligning at least two laser diode arrays such that a plurality of diodes (comprising at least one diode from each of the arrays) is assigned to each of the parallel tracks;

(b) selecting a primary diode from within the plurality of diodes. The primary diode:
  (i) receiving input data;
  (ii) emitting optical energy in correspondence with the data; and
  (iii) recording the data in its assigned track; and (c) in a case of a failure of the primary diode, selectively activating a functional secondary diode within the plurality of diodes that contains the failure.

Advantageously, the method may also comprise the step of detecting a failure in the primary diode. This detecting step would occur between the selecting step (b) and the selectively activating step (c).

The method may further comprise the step of delaying the flow of input data to the primary diode, so as to ensure that the primary diode is operative to record in the correct location on the recording surface independent of the primary diode being located on either of the laser diode arrays.

BRIEF DESCRIPTION OF THE DRAWINGS

FIG. 4 depicts only a perpendicular array implementation rather than a more complex angled array implementation.

DESCRIPTION OF THE PREFERRED EMBODIMENT

The invention herein disclosed concerns a method and apparatus for a fault tolerant recording system using a pair of laser diode arrays.

Figure 2:
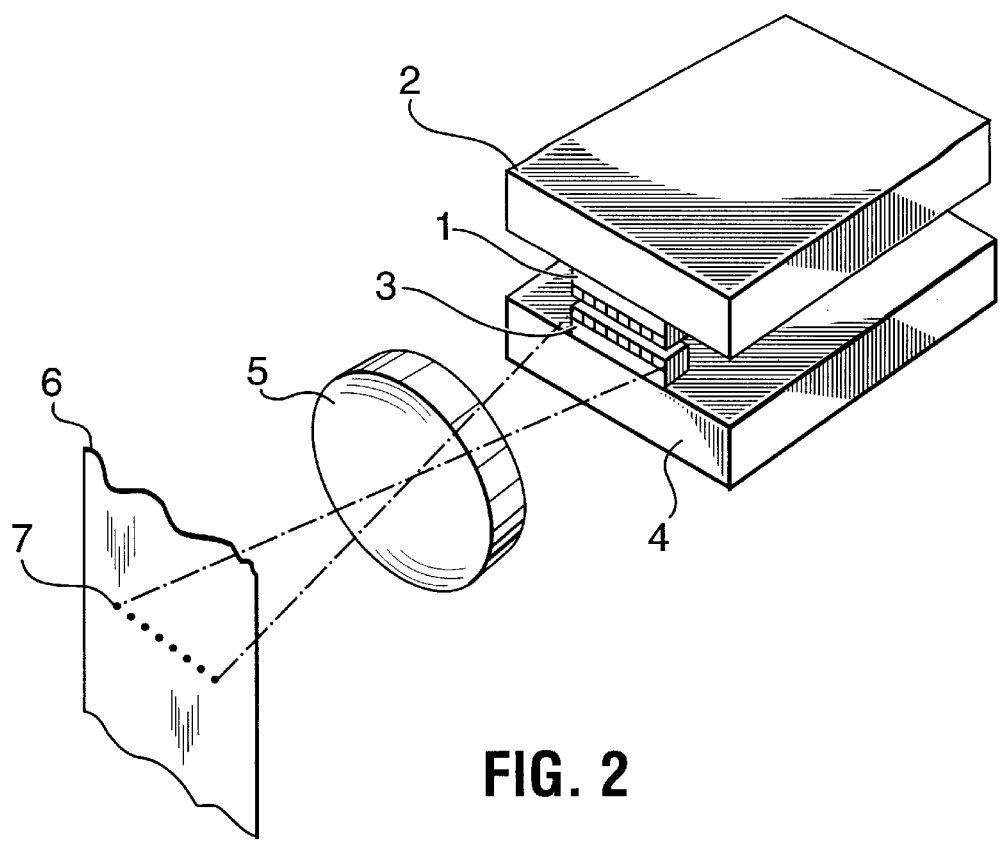
FIG. 2 schematically depicts an implementation of the present invention. The diode arrays are depicted in the desired face to face configuration, where each diode array is facing one another.

FIG. 2 depicts an embodiment of the present invention. Two monolithic laser diode arrays 1 and 3 made of individually addressable diodes arranged in a face to face configuration. The diode arrays 1 and 3 generate a great deal of heat and, as such, require to be mounted onto heat sinks 2 and 4. The size of the heat sinks 2 and 4 coupled with the field of view limitations of the imaging optics 5 necessitate the face to face configuration of the diode arrays 1 and 3. Although the invention described herein is not limited by the number or orientation of the diode arrays, if the diode arrays were arranged in other configurations (i.e. front to back), the size of the heat sink between the diode arrays would tend to force the diode arrays out of the field of view of the imaging optics 5.

Referring still to FIG. 2, the diodes of the two arrays 1 and 3 are aligned with one another so as to record parallel tracks 7 on a recording surface 6. Two diodes, (one diode from each of the arrays 1 and 3) are assigned to each track 7, but only one diode (the primary diode) is activated. If the primary diode fails, the secondary diode is activated and the functionality of the system is maintained.

A testing scheme is required to determine which, if any, diodes have failed. This testing may be implemented by analysis of either the output or input characteristics of the diodes. In attempting a prescribed test where each diode is selectively activated, the functional output of the diodes may be tested using a light detector. Alternatively or in addition, the test method may involve electronically testing the characteristics of each diode. Once the testing has determined that one or more failures exist, the primary and secondary arrays can be configured so as to activate the functional diodes and to maintain the functionality of the system.

The redundancy available from having two separate diodes assigned to a single track is exploited to provide a fault tolerance and to overcome the isolated failure of individual diodes.

Figure 3:
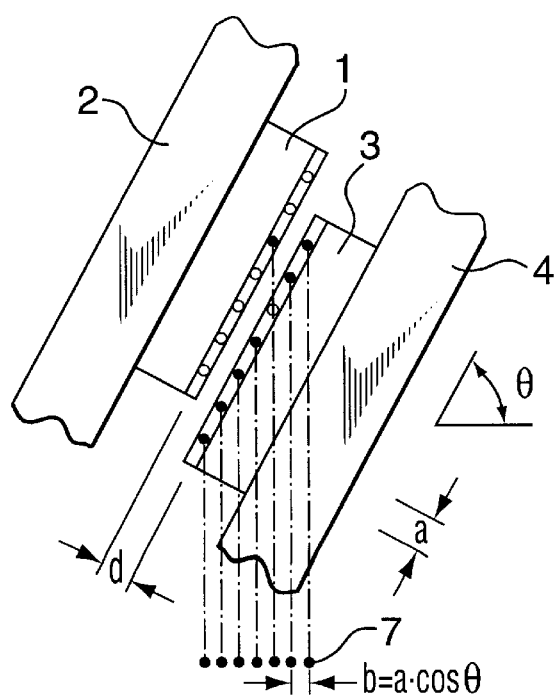
FIG. 3 depicts an angled implementation of the preferred embodiment of the present invention. As is the case with the single diode array, the effective track spacing is reduced.

Referring now to FIG. 3, an angled array implementation (the preferred embodiment) of the invention is depicted. Diode arrays 1 and 3 are oriented at an angle θ with respect to the recording surface (not shown). The arrays 1 and 3 are maintained in an alignment such that two diodes (one from each array 1 and 3) correspond to each parallel track 7. As with a single array implementation described in FIG. 1, the effective track spacing is reduced with the angled array configuration. The relatively wide spacing of the laser diodes a is effectively reduced by the angled array configuration, so that the corresponding track spacing is b=a.cos θ. As can be seen from the shaded diodes in the diagram, a failure of a diode in array 3 can be overcome by activation of a corresponding diode from array 1. Once again, the redundancy available from having two separate diodes assigned to a single track is exploited to provide a fault tolerance and to overcome the isolated failure of individual diodes.

Figure 1:
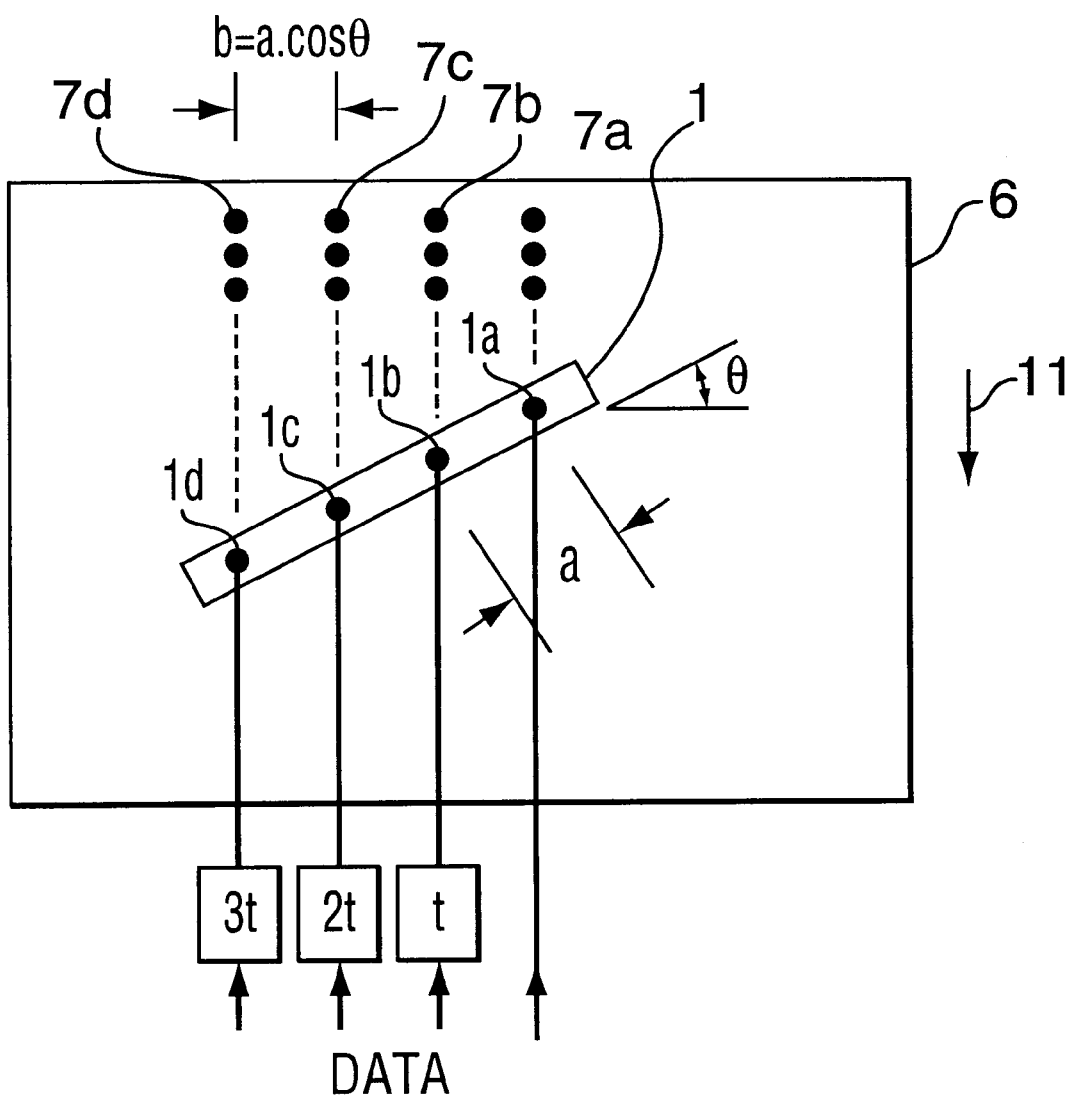
FIG. 1 depicts the prior art in angled diode array recording systems. The drawing depicts the manner in which the angled diode array coupled with digital delay techniques is used to reduce the effective track spacing.

As with a single array implementation described in FIG. 1, digital delays (not shown) are employed to synchronize the data from angled diode arrays 1 and 3 and to align the written marks on the recording surface (not shown). With the face to face diode arrays 1 and 3, however, the delay problem becomes more arduous because the delays must compensate not only for the angled configuration of arrays 1 and 3, but also for a writing from each of the two arrays 1 and 3.

Figure 4:
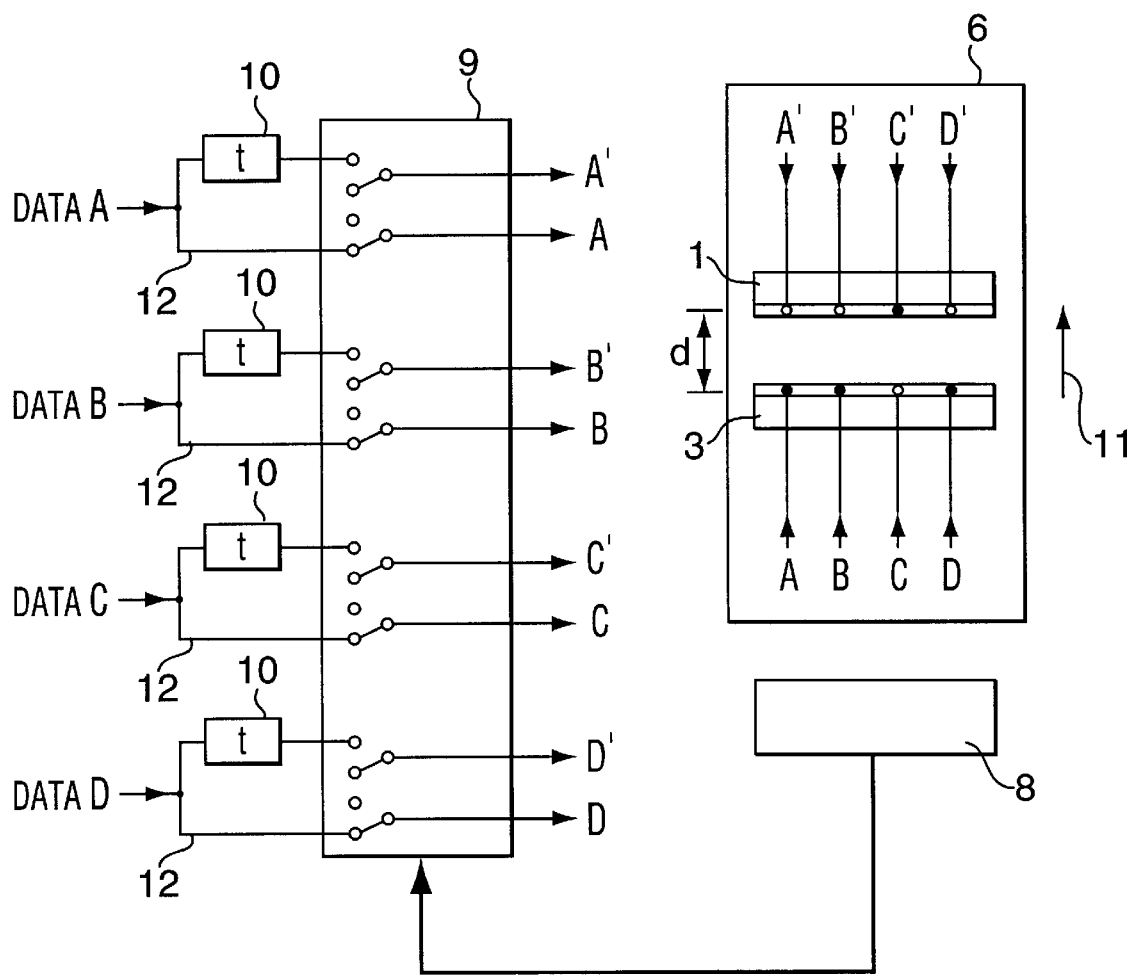
FIG. 4 shows how the present invention is used to overcome the failure of an isolated diode. For the sake of simplicity.

FIG. 4 depicts the delay architecture for a fault tolerant perpendicular array configuration. This represents the simplest implementation of the delay architecture for the two array system described in this invention. FIG. 4 also describes how the two array system is used to overcome a diode failure.

The two diode arrays 1 and 3 are aligned such that two diodes (one from each of arrays 1 and 3) are assigned to each track (not shown) and the arrays 1 and 3 are configured such that they are oriented perpendicularly to the scan direction 11.

In a test mode, the individual diodes (A, A', B, B', C, C', D, and D') are tested on light detector 8 by measuring the light output of each diode separately. During the test if, by way of example, it is determined that primary diode C is not working and consequently, secondary diode C' will be activated. The information relating the functionality of the various diodes (A, A', B, B', C, C', D, and D') is fed back to multiplexer 9 which applies the delays to the various data lines. Incoming data (DATA A, DATA B, DATA C, and DATA D) proceed into the multiplexer 9 on a delay line 10 and a straight connection line 12. The delay is the same for all of the data lines, and is related to both the scan velocity and the separation d of the arrays 1 and 3. For data lines (DATA A, DATA B and DATA D) the primary diodes A, B, and D are functional and so the multiplexer 9 switches are configured so that data flows on the straight connection lines 12 through to primary diodes A, B, and D. In the case of DATA C, delay is required so that secondary diode C' does not activate until the recording surface (not shown) has scanned to the appropriate position. The multiplexer 9 switch for DATA C is set on delay line 10 so that delayed data flows to secondary diode C'.

Clearly a diode need not be assigned permanently as a primary diode. For example, the role of primary diode can alternate between A and A', B and B' etc. in order to lower the average power dissipation on each diode. This will prolong diode life. Preferably, the primary diode as alternating between the two arrays (e.g. diodes A, B', C, D' are primary) to further assist heat dissipation.

Using this technique of coupling the two array system with a digital delay network, the redundancy available from having two separate diodes assigned to a single track is exploited to provide a fault tolerance and to overcome the isolated failure of individual diodes.

In order to reduce the effective track spacing, angularly oriented diode arrays or an interleaving recording technique is required. An angular orientation of the invention is depicted in FIG. 3. The angular orientation described in FIG. 3 introduces an additional delay which must be incorporated into each line. The delay network for an angular orientation is depicted in FIG. 1 and is described in the background section. That type of delay network may be serially connected with the delay network of FIG. 4 to produce a delay network that compensates for both the angular orientation and the multiple array system.

Where an interleaving technique is adopted, multiple passes (rather than angled array orientations) are employed to reduce the effective spacing between tracks. Consequently, there are no additional delay networks associated with the angled arrays and the only delay networks required are those of FIG. 4. However, additional software algorithms are required which control and buffer the data due to the multiple pass nature of the interleaving technique.

The invention is not limited by the number of arrays of laser diodes. Additional arrays merely provide additional levels of redundancy or pitch reduction (by staggering) and may be accommodated by aligning groups of diodes (i.e. one from each array) such that each diode in the group may record in a parallel track and that each group is assigned to a different track. Of course, the delay networks become slightly more complex, but they represent nothing more than a linear combination of the delay networks shown in FIGS. 1 and 4.

What is claimed is:

1. A fault tolerant laser diode array apparatus operative to record multiple parallel tracks on a recording surface, said apparatus comprising:
    (a) a plurality of laser diodes, said plurality comprising several groups of diodes, each of said groups of diodes assigned to a different one of said parallel tracks, and each of said groups of diodes having at least one primary diode, said primary diode operative when in an actuated state to:
        (i) receive input data;
        (ii) emit optical energy in correspondence with said data; and
        (iii) record said data in said assigned track; and
    (b) a selection subsystem which, in the case of a failure of any of said primary diodes, is operative to selectively activate a functional secondary diode within said group of diodes that contains said failure, and to maintain said primary diodes which have not failed in said actuated state.

2. An apparatus according to claim 1, wherein said selection subsystem is further operative to detect failure in any of said primary diodes.

3. An apparatus according to claim 1, wherein said plurality of laser diodes comprises at least two distinct laser diode arrays and said groups of diodes comprise at least one diode from each array.

4. An apparatus according to claim 3, which further comprises a delay network, said delay network operative to compensate said primary diodes, so as to ensure that said primary diodes are operative to record in a correct location on said recording surface, independent of said primary diodes being located on any of said distinct laser diode arrays.

5. An apparatus according to claim 1, wherein said plurality of laser diodes comprises diodes which are one of: single mode laser diodes and multi-mode laser diodes.

6. An apparatus according to claim 1, wherein said primary diodes are operative to record on said recording surface in a recording process which is one of: thermal in nature and photonic in nature.

7. An apparatus according to claim 1, wherein the number of groups of diodes within said plurality of laser diodes is between 10 and 1000.

8. A fault tolerant laser diode apparatus operative to record multiple parallel tracks on a recording surface, said apparatus comprising:
    (a) a plurality of laser diodes assigned to each of said parallel tracks, said plurality of diodes comprising one diode from each of at least two distinct arrays of diodes, and having at least one primary diode, said primary diode operative when in an activated state to:
        (i) receive input data;
        (ii) emit optical energy in correspondence with said data; and
        (iii) record said data in said assigned track; and
    (b) a selection subsystem which, in a case of a failure of said primary diode, is operative to selectively activate a functional secondary diode within said plurality of diodes that contains said failure.

9. An apparatus according to claim 8, wherein said selection subsystem is further operative to detect said failure of said primary diode.

10. An apparatus according to claim 8, wherein said plurality of laser diodes comprises at least one diode from each of several distinct laser diode arrays.

11. An apparatus according to claim 10, which further comprises a delay network, said delay network operative to compensate said primary diode, so as to ensure that said primary diode is operative to record in a correct location on said recording surface, independent of said primary diode being located on any of said distinct laser diode arrays.

12. An apparatus according to claim 8, wherein said plurality of laser diodes comprises diodes which are one of: single mode laser diodes and multi-mode laser diodes.

13. An apparatus according to claim 8, wherein said primary diode is operative to record on said recording surface in a recording process which is one of: thermal in nature and photonic in nature.

14. An apparatus according to claim 8, wherein said multiple parallel tracks number between 10 and 1000.

15. A fault tolerant monolithic laser diode array apparatus operative to record multiple parallel tracks on a recording surface, said apparatus comprising:
(a) two monolithic laser diode arrays, said arrays being arranged face to face in a manner such that a pair of diodes, comprising one diode from each of said arrays, is assigned to each one of said parallel tracks, said pair of diodes having a primary diode and a secondary diode, said primary diode operative to:
  (i) receive input data;
  (ii) emit optical energy in correspondence with said data; and
  (iii) record said data in said assigned track; and
(b) a selection subsystem which, in a case of a failure of said primary diode, is operative to activate said secondary diode within said pair of diodes that contains said failure, making said secondary diode into a primary diode.

16. An apparatus according to claim 15, wherein said selection subsystem is further operative to detect said failure of said primary diode.

17. An apparatus according to claim 15 which further comprises a delay network operative to compensate said primary diode, so as to ensure that said primary diode is operative to record in a correct location on said recording surface, independent of said primary diode being located on either of said monolithic laser diode arrays.

18. An apparatus according to claim 15, wherein said laser diode arrays comprise diodes which are one of: single mode laser diodes and multi-mode laser diodes.

19. An apparatus according to claim 15, wherein said primary diode is operative to record on said recording surface in a recording process which is one of: thermal in nature and photonic in nature.

20. An apparatus according to claim 15, wherein said multiple parallel tracks number between 10 and 1000.

21. A fault tolerant method of employing laser diode arrays to record multiple tracks on a recording surface, said method comprising the steps of:
(a) aligning at least two laser diode arrays such that a plurality of diodes, comprising at least one diode from each of said arrays, is assigned to each of said multiple tracks;
(b) selecting a primary diode from within said plurality of diodes, said primary diode:
  (i) receiving input data;
  (ii) emitting optical energy in correspondence with said data; and
  (iii) recording said data in said assigned track; and
(c) in a case of a failure of said primary diode, selectively activating a functional secondary diode within said plurality of diodes that contains said failure.

22. A method according to claim 21, which further comprises the step of detecting said failure of said primary diode, said detecting step occurring between said selecting step (b) and said selectively activating step (c).

23. A method according to claim 21, which further comprises the step of delaying a flow of input data to said primary diode, so as to ensure that said primary diode is operative to record in a correct location on said recording surface, independent of said primary diode being located on any of said laser diode arrays.

* * * * *